Patented Oct. 9, 1951

2,570,200

UNITED STATES PATENT OFFICE 2,570,200

WET EXTRUSION OF ACRYLONITRILE POLYMERS

Herman A. Bruson, Shaker Heights, Ohio, assignor to Industrial Rayon Corporation, Cleveland, Ohio, a corporation of Delaware No Drawing. Application June 13, 1949, Serial No. 98,878

21 Claims. (Cl. 18—54)

This invention relates to the production of shaped articles such as filaments, fibers, threads, yarns, films and the like, from polymers and copolymers of acrylonitrile. More specifically, the invention relates to a method of extruding polymeric solutions of acrylonitrile into a liquid coagulating medium to form such shaped articles.

Very useful polymers have been prepared from acrylonitrile with or without other polymerizable substances, for example, vinyl, vinylidene and other mono-ethylenic compounds, in which at least 80% by weight is acrylonitrile. These acrylonitrile polymers possess desirable physical and chemical properties including toughness and solvent resistance to common organic solvents such as methyl or ethyl alcohol, acetone, ethyl ether, ethyl acetate, hydrocarbon solvents, chlorinated hydrocarbons and the like. Because of these properties, it has been considered desirable that such polymeric materials be fashioned into fibers, films, and other shaped articles. The term "polymers" is intended herein also to include copolymers of acrylonitrile with other polymerizable substances.

A number of solvents have been proposed heretofore as being capable of dissolving polyacrylonitrile and acrylonitrile copolymers containing at least 80% by weight of acrylonitrile. In particular, there have been proposed a variety of nitrogen-containing organic solvents such as the formylated amines, cyclic amides, dinitriles, etc., and sulfur-containing solvents such as the sulfones, sulfoxides, etc.

Although many of these nitrogenous and sulfur-containing compounds are good solvents for such polymers, they have certain disadvantages when used industrially. For example, they are either expensive or extremely toxic, causing severe allergic reactions, dermatitis or degeneration of certain vital organs such as the kidney or the liver. Some of them, notably the aromatic diamines, nitrophenols, organic thiocyanates and nitriles are violent poisons. In addition, N,N-dimethyl formamide, a solvent particularly advocated for the spinning of polyacrylonitrile fibers, is toxic when its vapors are inhaled, even small concentrations adversely affecting the blood pressure. Furthermore, N,N-dimethyl formamide solutions of polyacrylonitrile tend to discolor rapidly at temperatures above 110° C. when heated in air, and yield stained fibers.

It has been proposed in the prior art that fibers from solutions such as are described above, be spun through spinnerets into coagulating baths, for example, water (Kropa, U. S. Patent 2,356,767), or aqueous solutions of inorganic salts such as calcium chloride and sodium thiocyanate, as well as triethanolamine, ethylene glycol, Carbitol and dilute sulfuric acid (Watkins, U. S. Patent 2,426,719 and 2,451,420).

Further, it has been pointed out by Watkins that glycerol is superior to any of these coagulants because it gives a denser fiber. However, for wet spinning, i. e., for coagulating a solution of the polymer by ejecting it through a spinneret into a liquid bath to form a fiber, the use of glycerol as a coagulant has certain operating difficulties and disadvantages, the principal ones being the gradual breakdown of the glycerol into acrolein and acidic bodies, and also the development of acrid and obnoxious fumes at the elevated temperatures employed. This disadvantage taken together with the fact that the solvents proposed for dissolving the polymer, notably N,N-dimethyl formamide, are particularly toxic, introduces additional operating difficulties and health hazards.

In accordance with the present invention, it has been found that useful shaped articles such as, for example, filaments, films and the like, may be prepared by extruding certain acrylonitrile polymer masses into a liquid coagulating medium comprising a water-soluble polyalkylene ether glycol having the formula

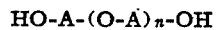

$$HO-A-(O-A)_n-OH$$

wherein "A" is an alkylene group having not less than two nor more than three carbon atoms and "n" is an integer greater than one. The extrudable masses employed in the process comprise an acrylonitrile polymer, containing in the polymer molecule at least 80% by weight of acrylonitrile, and as a solvent therefor a compound selected from the group consisting of the cyclic carbonates of 1,2-, 2,3-, and 1,3-dihydric aliphatic alcohols having no more than four carbon atoms in their alkylene radical. These extrudable polymer-solvent masses, hereinafter referred to as spinning solutions, may take the form of gels, dispersions, viscous liquids or, advantageously, true solutions.

By this invention the wet spinning and processing of threads and yarns, having high grade physical characteristics and appearance, may be conducted continuously for relatively long periods of time. More particularly, threads and yarns can be produced having a minimum of breaks and flaws, and having among other properties, a high degree of uniformity, high density and good white color with a minimum of discoloration.

Accordingly, the process of the present invention overcomes a number of difficulties normally present in the spinning of polyacrylonitrile solutions such as, for example, yarn discoloration; imperfect coagulating action by the liquid coagulant; difficulty in washing the solvent or coagulant, or both, from the freshly spun product; and other adverse effects to the products or processes caused by the decomposition of either the solvent or the coagulant, or both.

For example, the polyalkylene ether glycol coagulating baths employed do not evolve acrid, obnoxious or acidic decomposition products and vapors at the elevated spinning temperatures employed. In addition, the polyalkylene ether glycols can readily be removed by simple washing with water, prior to or subsequent to a stretching or fiber-orienting operation yielding substantially colorless filamentary products.

Likewise, the aliphatic cyclic carbonates which are employed in the present invention as solvents to prepare the polymeric spinning solutions have, in themselves, several important advantages over other acrylonitrile polymer solvents. They have no acidity or alkalinity, contain no nitrogen or sulfur and do not break down in the present process to form corrosive, harmful, or toxic products. Further, since they are decomposed in the human body to carbon dioxide and relatively non-toxic glycols, they are remarkably free from toxic or allergic reactions. Nevertheless, they are very powerful gelatinizing agents and solvents for polyacrylonitrile and copolymers of acrylonitrile containing at least 80% acrylonitrile in the polymer molecule.

Typical polyalkylene ether glycols which can be used as coagulants in practicing this invention are:

HO—CH₂CH₂—O—CH₂CH₂—O—CH₂CH₂OH
Triethylene glycol

HO—CH₂CH₂—(O—CH₂—CH₂)₂—O—CH₂CH₂OH
Tetraethylene glycol

HO—CH₂CH₂—(O—CH₂CH₂)₃—O—CH₂CH₂OH
Pentaethylene glycol

HO—CH₂CH₂—(O—CH₂CH₂)₇—O—CH₂CH₂OH
Nonaethylene glycol

HO—CH₂CH₂—(O—CH₂CH₂)₈ to 50—O—CH₂CH₂OH
Polyethylene glycol

HO—C₃H₇—O—C₃H₇—O—C₃H₇—OH
Tripropylene glycol

HO—C₃H₇—(O—C₃H₇)₂—O—C₃H₇—OH
Tetrapropylene glycol

HO—C₃H₇—(O—C₃H₇)ₓ—O—C₃H₇—OH
Polypropylene glycols
(having molecular weights between about 400 and 750)

Of the higher water-soluble polyglycol ethers, those having less than about 50 alkylene groups may be employed with advantage. In general, the lower molecular weight glycols are preferred for the present process. Particular advantages, however, are derived by employing as coagulants, tetraethylene glycol, tripropylene glycol, or preferably, triethylene glycol, especially when extruding polymeric spinning solutions made with ethylene carbonate as the solvent.

The aliphatic cyclic carbonates which may be employed as solvents for preparing the acrylonitrile polymer spinning solutions are the following:

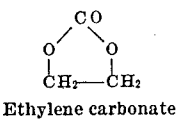
Ethylene carbonate

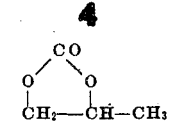
Propylene carbonate

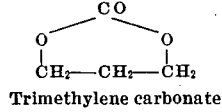
Trimethylene carbonate

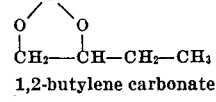
1,2-butylene carbonate

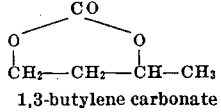
1,3-butylene carbonate

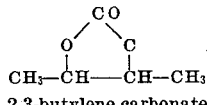
2,3-butylene carbonate

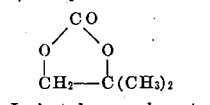
Isobutylene carbonate

Especially advantageous are the lower molecular weight members of the above group, particularly, ethylene carbonate.

The filamentary materials produced by the method of this invention, may be stretched and heat treated so as to produce oriented products having high tenacity, high elastic recovery, low shrinkage, etc.

This invention will be more fully described by the following examples, although it is understood that the invention is not intended to be limited by these examples. In these examples "parts" and "percent" of materials is intended to mean parts and percent by weight.

*Example I*

A 20% solution in ethylene carbonate of polyacrylonitrile (average molecular weight 60,500) heated to about 100° C., was forced through a 40-hole spinneret (.003 inch diameter holes) into a bath of tetraethylene glycol heated to 125° C. The coagulated bundle of filaments was led between two guides for a distance of 25 inches bath travel to a second bath consisting of tetraethylene glycol heated to 140° C. where it was stretched between two rotating drums to 8.55 times its original length, the second drum being driven at about 125 meters per minute. The fiber thus obtained was washed with cold water and air dried. It formed a white yarn having the following properties:

Denier _____ 68
Tenacity _____grams per denier__ 4.8
Elongation at break _____per cent__ 9

The yarn was then passed in a relaxed condition through a heated chamber positioned between two positively-driven drums having different peripheral speeds at 135° C. for five minutes. The second or take-up drum was rotated 0.855 times as rapidly as the first of the pair of drums, to yield a yarn having a tenacity of 4.6 grams per denier and an elongation at break of 19%. The yarn had a soft woolly texture when cut into staple lengths. Its shrinkage in boiling water was less than about 3%.

Example II

A 20% solution in ethylene carbonate of a copolymer of 98% acrylonitrile and 2% morpholinoethyl vinyl ether

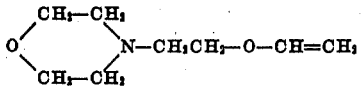

(average molecular weight 50,000) was heated to 90° C. and extruded through a 40-hole spinneret (.003 inch diameter holes) into a bath of triethylene glycol heated to 114° C. The coagulated bundle of filaments was processed as described in Example I except that it was stretched in air at 130° C. between rotating drums to 8.55 times its original length. A white yarn was formed having the following properties prior to the heat-treating step:

Denier _____ 89
Tenacity _____grams per denier__ 3.7
Elongation _____per cent__ 11

After the heat-treating step, the yarn showed a tenacity of 3.6 grams per denier and an elongation at break of 20%.

In place of the triethylene glycol or tetraethylene glycol the corresponding tripropylene glycol and tetrapropylene glycol can be used, or any of the other water-soluble polyalkylene ether glycols of the present invention.

Example III

A 23% solution in ethylene carbonate of a copolymer of 80% acrylonitrile, 15% vinyl chloride and 5% vinylidene chloride (average molecular weight 58,000) was heated to 100° C. and extruded through a 40-hole spinneret (.003 inch diameter holes) into a bath of polyethylene glycol (average molecular weight 400) heated to 115° C. The coagulated bundle of filaments was processed as in Example II by stretching in air at 135° C. to eight times its original length and then washed and dried. The stretched and heat-treated yarn obtained showed a tenacity of 4.3 grams per denier and an elongation of 19.5%.

Fibers having especially advantageous properties such as high orientation, high tenacity, high elastic recovery, low shrinkage, etc., may be prepared from the compositions of this invention by using polyacrylonitrile or acrylonitrile copolymers of vinyl esters (vinyl acetate, vinyl formate, vinyl benzoate), vinyl ethers, and vinyl ketones; acrylic acid and its esters and amides; methacrylic acid and its esters, amides, and nitriles; maleic, itaconic, fumaric acids and their esters, amides and nitriles; allyl alcohol and its esters; styrene and nuclear substituted styrenes, e. g. chloro- and dichlorostyrene; halogenated monoethylenic compounds such as vinyl chloride, vinyl fluoride, and vinylidene chloride; and the like. In these copolymers, as well as other acrylonitrile copolymers, the acrylonitrile content in the polymer molecule is preferably at least 80%, and in some cases, copolymers having a greater percentage of acrylonitrile are particularly advantageous.

Of particular interest because they can be dyed with acid dyes are copolymers of acrylonitrile with various vinyl-substituted amines such as, for example, vinylpyridine, mono-vinyl ethers of amino alcohols and the salts of such compounds. Advantageously, these compounds comprise less than about 10 mole percent of the copolymer.

For various purposes it may be desirable to chemically and physically modify the polymeric compositions of this invention by the presence of other materials such as, for example, pigments, dyes, plasticizers, stabilizers, spinning agents, etc.

The acrylonitrile polymers and copolymers may be prepared by any suitable polymerization method such as, for example, the ammonium persulfate catalyzed polymerization of monomer or monomers dissolved or emulsified in water. Molecular weights of these polymers and copolymers are preferably within the range of 10,000 and 250,000, or even higher, although polymers having molecular weights between 30,000 and 150,000 may be used with particular advantage in the production of fibers.

In general, the spinning solutions may be prepared by heating the finely divided acrylonitrile polymer or copolymer in the presence of the cyclic carbonate solvents of the present invention at temperatures from about 50° C. to about 100° C. Advantageously, the heated mixtures of polymer and solvent, or solutions thereof, are maintained in inert or oxygen-free atmospheres to minimize discoloration. Preferably, these spinning solutions should have a solids content between about 10 to 35% solids. In the preferred form of this invention, the temperature of the spinning solution at extrusion is maintained between about 80° and 120° C. However, if desired, under suitable conditions higher temperatures may be employed such as, for example, up to about 150° C.

The liquid glycol ether coagulating medium into which such spinning solutions are extruded in accordance with the present invention, are preferably maintained at temperatures between about 50° and 150° C. However, if desired, higher temperatures may be employed under suitable conditions, for example, up to about 175° C. The coagulating medium may consist of the polyalkylene ether glycols alone, i. e. either one of such polyglycol ethers or mixtures thereof, or if desired, such glycol ethers may contain suitable amounts of other materials such as, for example, varying quantities of water or organic materials, e. g. ethylene carbonate. In general, when water is employed in combination with the glycol ethers, the lower bath temperatures may be employed with advantage.

The cyclic carbonate spinning solutions of this invention are capable of being continuously extruded into the polyglycol ether baths above described, for long periods of time. During such spinning, there is a continuous accumulation of the carbonate solvent in the coagulating medium. It has been found that the cyclic carbonate solvents and particularly ethylene carbonate, can successfully be reclaimed from the coagulants of the present invention with facility and a high degree of efficiency. Thus, for example, ethylene carbonate can be distilled from a used glycol ether coagulating bath with a minimum loss due to decomposition of either the solvent or the coagulant. The cyclic carbonate solvents recovered in this manner may be recycled and re-used in the preparation of additional polymer spinning solutions. Likewise, the polyglycol ether coagulants remaining, from which the solvent has been separated, may with advantage, be re-used directly to supplement the coagulating medium.

The freshly coagulated materials formed according to the method of wet spinning described above, contain the solvent and the glycol ether coagulant, both of which are water-soluble. Advantageously, therefore, they may be washed with aqueous media such as water or steam and then stretched up to 600-1000 percent or more. If desired, the washing treatment may be performed before or after the stretching operation, or both. The stretching may be accomplished in secondary baths containing materials similar to those suitable for use in the coagulating baths of this invention, or if desired, in other heated media such as, for example, inert liquids, vapors or gases, e. g. steam. As previously indicated, steam may be employed both as the aqueous washing medium and also as the heated stretching medium. Further, if desired, the freshly formed thread and yarn products may, while in the presence of steam, substantially simultaneously, be washed with an aqueous medium and stretched. Or, alternatively, if desired, under suitable conditions, the freshly formed thread and yarn products may be treated directly with steam while simultaneously stretching.

The stretched products may be heat treated while in a relaxed condition at temperatures of between about 100° C. and 180° C. to improve their physical properties. The expression "relaxed condition" is intended to include the heat treatment of threads and yarns at no tension at all or preferably, at relatively low tensions such as, for example, between about 0.01 and 0.3 gram per denier.

Oleaginous materials such as finishing oils or waxes, may be applied to the yarn and thread products after the heat treating step, or if desired, before the heat treating step.

Fibers obtained in accordance with the invention can be stretched to form oriented structures of high tenacity and high elastic recovery. These stretched fibers exhibit characteristic X-ray patterns showing orientation along the fiber axis. Yarns made from these fibers may be used in the manufacture of hosiery and, because of their heat-resistance, may also be fashioned into more general, all-purpose fabrics such as for blouses, suits, skirts, etc.

I claim:

1. The method of forming a shaped article which comprises extruding into a liquid coagulating medium, a composition comprising a compound selected from the group consisting of the cyclic carbonates of 1,2-, 2,3-, and 1,3-dihydric aliphatic alcohols having no more than four carbon atoms in their alkylene radical and a polymer of acrylonitrile containing in the polymer molecule at least 80% by weight of acrylonitrile; said coagulating medium comprising a water-soluble polyalkylene ether glycol having the formula $$HO—A—(O—A)_n—OH$$

wherein "A" is an alkylene group having not less than two nor more than three carbon atoms and "$n$" is an integer greater than one.

2. The method of forming a shaped article which comprises extruding into a liquid coagulating medium, a composition comprising ethylene carbonate and a polymer of acrylonitrile containing in the polymer molecule at least 80% by weight of acrylonitrile; said coagulating medium comprising a water-soluble polyalkylene ether glycol having the formula $$HO—A—(O—A)_n—OH$$

wherein "A" is an alkylene group having not less than two nor more than three carbon atoms and "$n$" is an integer greater than one.

3. The method of forming a shaped article which comprises extruding into a liquid coagulating medium, a composition comprising ethylene carbonate and a polymer of acrylonitrile containing in the polymer molecule at least 80% by weight of acrylonitrile; said coagulating medium comprising triethylene glycol.

4. The method of forming a shaped article which comprises extruding into a liquid coagulating medium, a composition comprising ethylene carbonate and a polymer of acrylonitrile containing in the polymer molecule at least 80% by weight of acrylonitrile; said coagulating medium comprising tetraethylene glycol.

5. The method of forming a shaped article which comprises extruding into a liquid coagulating medium, a composition comprising ethylene carbonate and a polymer of acrylonitrile containing in the polymer molecule at least 80% by weight of acrylonitrile; said coagulating medium comprising tripropylene glycol.

6. The method of forming a shaped article which comprises the steps of extruding into a liquid coagulating medium, a composition comprising ethylene carbonate and a polymer of acrylonitrile containing in the polymer molecule at least 80% by weight of acrylonitrile and washing the formed product with an aqueous medium; said coagulating medium comprising a water-soluble polyalkylene ether glycol having the formula $$HO—A—(O—A)_n—OH$$

wherein "A" is an alkylene group having not less than two nor more than three carbon atoms and "$n$" is an integer greater than one.

7. The method of forming an oriented fiber which comprises the steps of extruding through a spinneret into a liquid coagulating medium, a composition comprising ethylene carbonate and a polymer of acrylonitrile containing in the polymer molecule at least 80% by weight of acrylonitrile and orienting the formed product by stretching it in the presence of a heated media; said coagulating medium comprising a water-soluble polyalkylene ether glycol having the formula $$HO—A—(O—A)_n—OH$$

wherein "A" is an alkylene group having not less than two nor more than three carbon atoms and "$n$" is an integer greater than one.

8. The method of forming an oriented fiber which comprises the steps of extruding through a spinneret into a liquid coagulating medium, a composition comprising ethylene carbonate and a polymer of acrylonitrile containing in the polymer molecule at least 80% by weight of acrylonitrile and orienting the formed product by stretching while subjecting it to the action of steam; said coagulating medium comprising a water-soluble polyalkylene ether glycol having the formula $$HO—A—(O—A)_n—OH$$

wherein "A" is an alkylene group having not less than two nor more than three carbon atoms and "$n$" is an integer greater than one.

9. The method of forming an oriented fiber which comprises the steps of extruding through a spinneret into a liquid coagulating medium, a composition comprising ethylene carbonate and a polymer of acrylonitrile containing in the polymer molecule at least 80% by weight of acrylonitrile, washing the formed product with an aqueous medium and orienting said washed product by stretching while subjecting it to the action of steam at an elevated temperature; said coagulating medium comprising a water-soluble polyalkylene ether glycol having the formula HO—A—(O—A)$_n$—OH wherein "A" is an alkylene group having not less than two nor more than three carbon atoms and "n" is an integer greater than one.

10. The method of forming an oriented fiber which comprises the steps of extruding through a spinneret into a liquid coagulating medium, a composition comprising ethylene carbonate and a polymer of acrylonitrile containing in the polymer molecule at least 80% by weight of acrylonitrile, orienting the formed product by stretching it in a heated media and heat treating said oriented fiber while it is in a relaxed condition; said coagulating medium comprising a water-soluble polyalkylene ether glycol having the formula HO—A—(O—A)$_n$—OH wherein "A" is an alkylene group having not less than two nor more than three carbon atoms and "n" is an integer greater than one.

11. The method of forming an oriented fiber which comprises the steps of extruding through a spinneret into a liquid coagulating medium, a composition comprising ethylene carbonate and a polymer of acrylonitrile containing in the polymer molecule at least 80% by weight of acrylonitrile, washing the formed product with an aqueous medium and orienting said washed product by stretching; said coagulating medium comprising a water-soluble polyalkylene ether glycol having the formula HO—A—(O—A)$_n$—OH wherein "A" is an alkylene group having not less than two nor more than three carbon atoms and "n" is an integer greater than one.

12. The method of forming an oriented fiber which comprises the steps of extruding through a spinneret into a liquid coagulating medium, a composition comprising ethylene carbonate and a polymer of acrylonitrile containing in the polymer molecule at least 80% by weight of acrylonitrile, washing the formed product with an aqueous medium and orienting said washed product by stretching; said coagulating medium comprising triethylene glycol.

13. The method of forming an oriented fiber which comprises the steps of extruding through a spinneret into a liquid coagulating medium, a composition comprising ethylene carbonate and a polymer of acrylonitrile containing in the polymer molecule at least 80% by weight of acrylonitrile, washing the formed product with an aqueous medium and orienting said washed product by stretching; said coagulating medium comprising tetraethylene glycol.

14. The method of forming an oriented fiber which comprises the steps of extruding through a spinneret into a liquid coagulating medium, a composition comprising ethylene carbonate and a polymer of acrylonitrile containing in the polymer molecule at least 80% by weight of acrylonitrile, washing the formed product with an aqueous medium and orienting said washed product by stretching; said coagulating medium comprising tripropylene glycol.

15. The method of forming an oriented fiber which comprises the steps of extruding through a spinneret into a liquid coagulating medium, a composition comprising ethylene carbonate and a polymer of acrylonitrile containing in the polymer molecule at least 80% by weight of acrylonitrile, washing the formed product with water; subjecting said washed product to the action of steam at an elevated temperature while stretching it; heating the resulting oriented fiber to an elevated temperature while maintaining it in a relaxed condition; and thereafter treating the fiber with an oleaginous material; said polymer having a molecular weight between about 30,000 and 150,000; and said coagulating medium comprising triethylene glycol.

16. The method of forming a shaped article which comprises admixing ethylene carbonate and a polymer of acrylonitrile containing in the polymer molecule at least 80 by weight of acrylonitrile; extruding said mixture into a liquid coagulating bath comprising a water-soluble polyalkylene ether glycol having the formula HO—A—(O—A)$_n$—OH wherein "A" is an alkylene group having not less than two nor more than three carbon atoms and "n" is an integer greater than one; withdrawing the resulting formed product from said coagulating bath; removing at least a portion of said coagulating bath liquid from said bath and recovering ethylene carbonate therefrom; returning at least a portion of the resulting treated coagulating bath liquid to said coagulating bath; admixing at least a portion of said recovered ethylene carbonate with said acrylonitrile polymer; and thereafter repeating the cycle.

17. The method of forming a shaped article which comprises admixing ethylene carbonate and a polymer of acrylonitrile containing in the polymer molecule at least 80% by weight of acrylonitrile; extruding said mixture into a liquid coagulating bath comprising a water-soluble polyalkylene ether glycol having the formula HO—A—(O—A)$_n$—OH wherein "A" is an alkylene group having not less than two nor more than three carbon atoms and "n" is an integer greater than one; withdrawing the resulting formed product from said coagulating bath; removing at least a portion of said coagulating bath liquid from said bath; heating said removed liquid and evaporating therefrom ethylene carbonate; collecting said evaporated ethylene carbonate; returning at least a portion of said evaporated coagulating bath liquid to said coagulating bath; admixing at least a portion of said collected ethylene carbonate with said acrylonitrile polymer; and thereafter repeating the cycle.

18. An acrylonitrile polymer coagulating medium comprising ethylene carbonate and a water-soluble polyalkylene ether glycol having the formula HO—A—(O—A)$_n$—OH wherein "A" is an alkylene group having not less than two nor more than three carbon atoms and "n" is an integer greater than one.

19. An acrylonitrile polymer coagulating medium comprising ethylene carbonate and triethylene glycol.

20. An acrylonitrile polymer coagulating medium comprising ethylene carbonate and tetraethylene glycol.

21. An acrylonitrile polymer coagulating medium comprising ethylene carbonate and tripropylene glycol.

HERMAN A. BRUSON.

(References on following page)

REFERENCES CITED

The following references are of record in the file of this patent:

UNITED STATES PATENTS

| Number | Name | Date |
|---|---|---|
| 2,056,830 | Coleman et al. | Oct. 6, 1936 |
| 2,210,771 | Miles | Aug. 6, 1940 |
| 2,426,719 | Watkins | Sept. 2, 1947 |

FOREIGN PATENTS

| Number | Country | Date |
|---|---|---|
| 896,083 | France | Feb. 12, 1945 |

OTHER REFERENCES

Journal of Industrial and Engineering Chemistry, vol. 18, 1926, pages 670 and 671 (Davidson).